United States Patent [19]

Palmquist et al.

[11] Patent Number: 4,802,726
[45] Date of Patent: Feb. 7, 1989

[54] METHODS OF AND APPARATUS FOR RECONFIGURING OPTICAL FIBER CONNECTOR COMPONENTS AND PRODUCTS PRODUCED THEREBY

[75] Inventors: John M. Palmquist, Lilburn; Morton J. Saunders, Atlanta, both of Ga.

[73] Assignee: American Telephone and Telegraph Company, AT&T Technologies, Inc., Berkeley Heights, N.J.

[21] Appl. No.: 106,095

[22] Filed: Oct. 8, 1987

[51] Int. Cl.$^4$ .............................................. G02B 6/36
[52] U.S. Cl. ................................ 350/96.20; 350/320
[58] Field of Search ............... 350/96.20, 96.21, 96.22, 350/320

[56] References Cited

U.S. PATENT DOCUMENTS

| | | | |
|---|---|---|---|
| 4,512,630 | 4/1985 | Runge | 350/96.21 |
| 4,673,245 | 6/1987 | Kling et al. | 350/96.20 |
| 4,721,357 | 1/1988 | Kovalchick et al. | 350/96.21 X |

OTHER PUBLICATIONS

N. K. Chueng et al., "An Automatic Inspection System For Single Fiber Connector Plugs", *Technical Digest-Symposium On Optical Fiber Measurements*, 1980.
W. C. Young, L. Curtis, P. Kaiser, "Biconic Single-mode Connectors With Insertion Losses Below 0.3dB", OFC '82.
W. C. Young et al., "Low-loss Field-installable Biconic Connectors For Single-mode Fibers", OFC, New Orleans, 1983.

Primary Examiner—John D. Lee
Assistant Examiner—Phan Heartney
Attorney, Agent, or Firm—Edward W. Somers

[57] ABSTRACT

A biconic connector includes two plugs (44—44) each terminating a single fiber optical cable (55) and each including a conically shaped end portion (50). In order to minimize loss through a connection, the axis of an end portion of the optical fiber in the conically shaped end portion of the plug should be substantially coincident with the axis of revolution of the conically shaped end portion. This is accomplished by holding the plug in a fixture such that its conically shaped end portion is exposed and the fixture adapted to be turned about an axis of rotation (105). Scattered light from a laser (166) directed toward a gauging length (100) of optical fiber in a passageway of the plug and extending beyond an end face thereof as the plug is turned rotatably is received on a target area. The fixture is turned pivotally to cause the axis of the gauging fiber to parallel the axis of rotation. Images of light are launched toward the optical fiber tranversely of its longitudinal axis at a plurality of positions spaced apart circumferentially through a known angle. The axis of rotation and the eccentricity of a centroid of the gauging fiber are determined from these images. Adjustments are then made to cause the centroid of the fiber to be coincident with the axis of rotation. Subsequently, the plug end portion is reconfigured to cause the axis of revolution and a portion of the axis of the gauging fiber to be substantially coincident.

24 Claims, 7 Drawing Sheets

FIG A

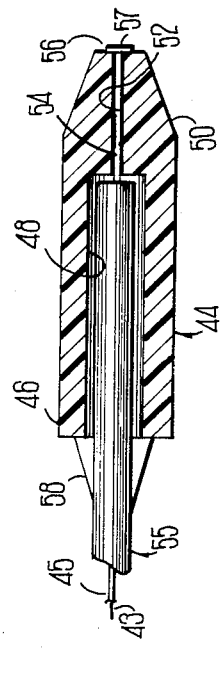
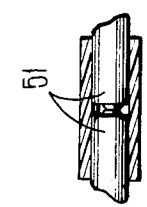
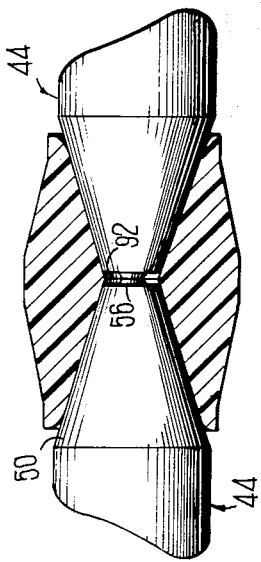
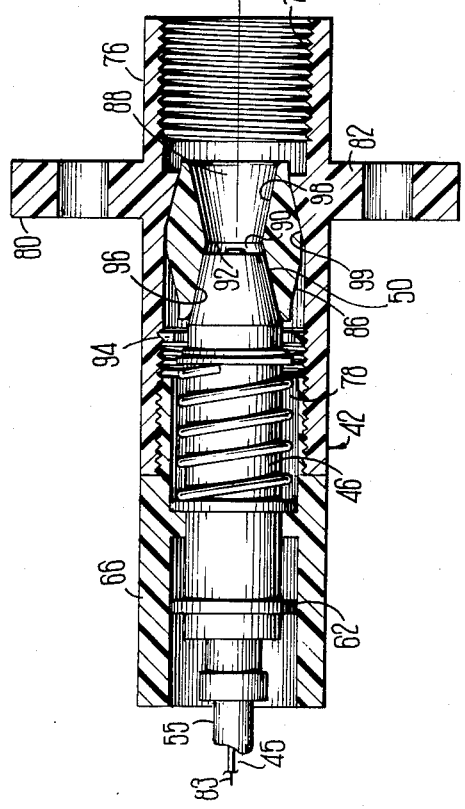

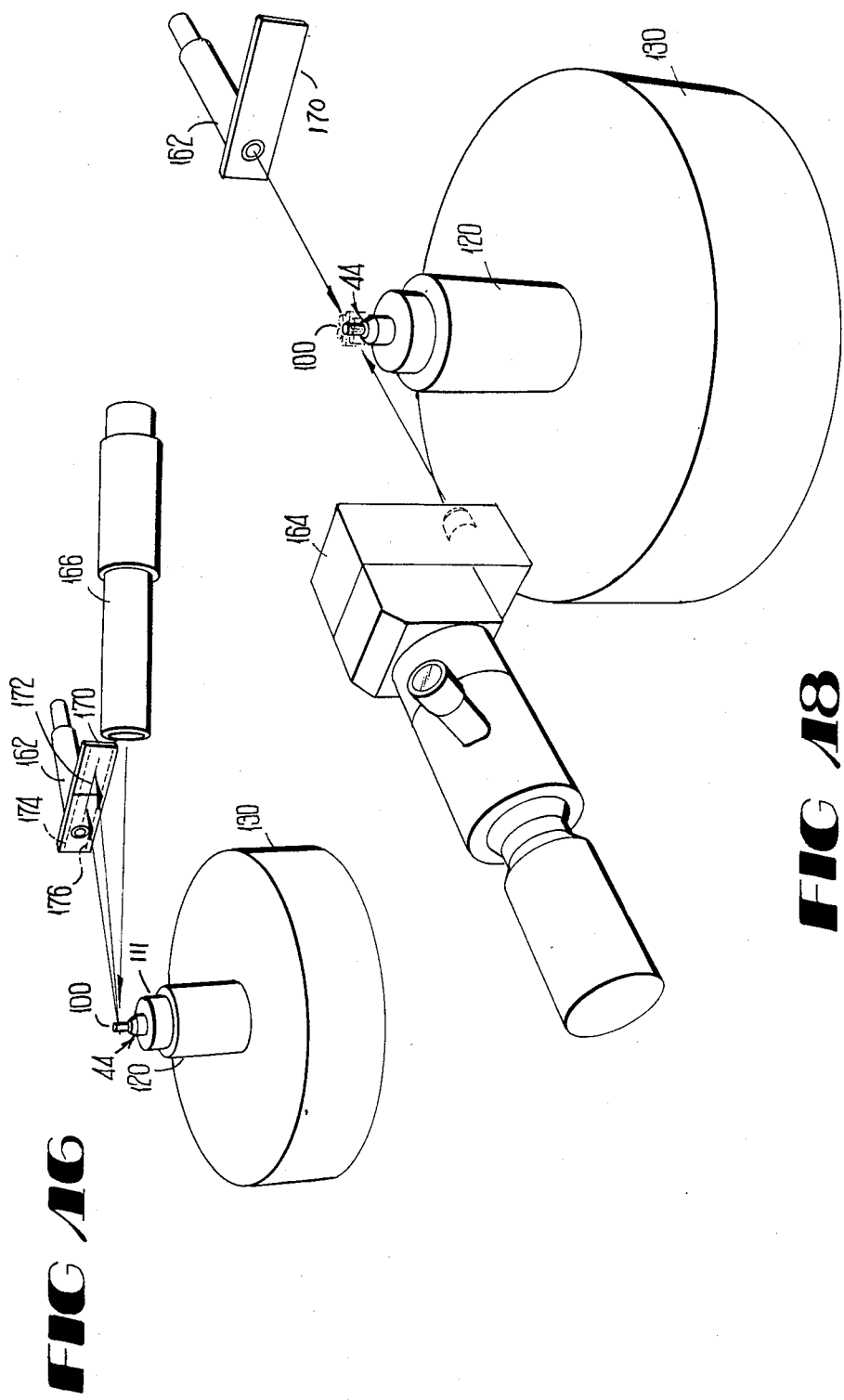

METHODS OF AND APPARATUS FOR RECONFIGURING OPTICAL FIBER CONNECTOR COMPONENTS AND PRODUCTS PRODUCED THEREBY

TECHNICAL FIELD

This invention relates to methods of and apparatus for reconfiguring optical fiber connector components and products produced thereby. More particularly, this invention relates to post-molding methods and apparatus for grinding optical fiber termination plugs to cause a centroidal axis of a portion of a gauging member in a passageway of each plug to be substantially coincident with the axis of revolution of a conical alignment surface of the plug so that when two plugs are mounted in an alignment sleeve, optical fibers disposed in the passageways are aligned.

BACKGROUND OF THE INVENTION

The use of optical fibers in communications is growing at an unprecedented rate. Low loss optical fibers which are produced by any one of several techniques may be assembled into ribbons which are then assembled into cables, or stranded into cables, or they may be enclosed singularly in a jacket and used in various ways in a central office, for example.

In order to assure that low loss fibers which are produced today are not diminished in their effectiveness in systems, the fibers must be connected through intermateable connectors which preserve those low losses. For fiber ribbons, connectors comprise grooved chips which hold a plurality of fibers of one ribbon in alignment with fibers of another ribbon. Such a connector is shown for example in U.S. Pat. No. 3,864,018 which issued on Feb. 4, 1975 in the name of C. M. Miller.

For single fiber cables, connections may be made through a connector which is referred to as a biconic connector. See U.S. Pats. Nos. 4,107,242 and 4,512,630 which issued on Aug. 15, 1978 and Apr. 23, 1985, in the name of P. K. Runge. That connector includes a housing in which is mounted a biconic alignment sleeve. The sleeve includes two truncated, conically shaped cavities which communicate with each other through a common plane which has the least diameter of each cavity. Each of two fibers to be connected is terminated with a plug comprising a cylindrical portion connected to a primary pedestal, a truncated, conically shaped end portion, which is adapted to be received in one of the cavities of the sleeve. The conically shaped surfaces of the plug and of the sleeve serve as alignment surfaces. The plug is urged into seated engagement with the wall defining the cavity in which it is received. The fiber extends through a passageway in the plug and has an end which terminates in a secondary pedestal of the plug. Generally, a plug is molded about an end portion of an optical fiber; however, there is a demand for plugs having passageways molded therein for the field termination of optical fibers.

Minimal loss between the connected fibers is achieved when the cores of fibers which are terminated by the plugs are aligned coaxially and when the longitudinal offset along the axes of the plugs is zero and fiber end faces, each of which is planar, contact in a common plane. Considering the size of the fibers, for example a single mode one with a core diameter of 8 microns and a cladding diameter of 125 microns, the task of providing conical plug and sleeve surfaces in order to meet alignment and end separation requirements is a formidable one. Generally, the plugs are molded from a transfer molding grade epoxy composition material. Although the surface tolerances which are achieved when molding the alignment sleeves and conic tapers are excellent, they are not sufficient to achieve consistently the desired alignment and end separation.

Problems arise because the opening in the end face of the pedestal and hence the optical fiber may not be centered with respect to the axis of revolution of the truncated, conically shaped portion. The axis of revolution of the conically shaped alignment surface of the end portion may also be referred to as the conical axis. As a result, the cores of the fibers terminated by two plugs held in the sleeve may have sufficient transverse or lateral offset to affect adversely the transmission of signals. Also, the centroidal axis of the end portion of the core of the fiber disposed in the passageway may not be coincident with the axis of revolution of the conically shaped end portion of the plug. Consequently, the light emitted from one fiber may not be parallel to the axis of the receiving fiber. This problem which is referred to as angular offset may also occur when the plug is molded about an end portion of an optical fiber. The angle between the fiber axis and the axis of revolution of the alignment surface of the plug end portion is commonly referred to as the exit angle of the plug.

Control of the exit angle as well as that of lateral offset is essential for achieving low loss connections and high yields in optical fiber connector manufacture. The control of these parameters insures that when two plugs are disposed in an alignment sleeve, not only will the end faces just touch, but that the fiber axes will be substantially coaxial.

A prior art method of reconfiguring an end portion of an optical connector into a passageway of which an optical fiber has not yet been inserted is disclosed in "Low-Loss field installable biconic connectors for single-mode fibers" by W. C. Young, et al., appearing in the OFC proceedings of Feb. 28 to Mar. 2, 1983. In this method, a light beam is projected through a passageway from a back end of the connector and a microscope is used to view the resulting back-lit boundary of an end portion of the passageway. As the plug is rotated on a support, an operator observes and adjusts manually the position of the plug until a disk of light bounded by the end portion of the passageway appears to be coaxial with the axis of rotation of the support. At that time, the alignment surface of the plug is reconfigured to become coaxial with the axis of rotation of the support and coincident with the apparent center of the boundary of the passageway as determined by the observer.

The hereinbefore-identified problems also have been overcome in the manufacture of factory terminated connectors as disclosed in copending, commonly assigned application Ser. No. 802,500 and application Ser. No. 802,492 (Pat. No. 4,721,357) filed on Nov. 27, 1985 in the names of R. P. Lyons, et al. and J. S. Kovalchick, et al., respectively. For plugs that have been terminated with an illuminated fiber having an end face polished perpendicular to the conic alignment surface of the plug, angular information may be precisely determined by the methods of hereinbefore identified copending application No. 802,492.

Machine vision-assisted methods as described in copending application Ser. No. 802,500 may be applied to assist in locating the centroid of the area defined by the boundary of the passageway. Unfortunately, the same technique applied to a back-lit passageway suffers from the effects of nonuniform illumination caused by defects or contamination of the passageway by foreign material or mold flash. As a result, both the angular and centroidal alignment of field mountable connectors by the axial viewing of light exiting the passageway is not as precise as when a fiber in the passageway is illuminated.

One disadvantage of such methods is that the location of the centroid of the light beam in the passageway in general is not the same as the centroid of a fiber end face which is intended to be disposed in the passageway when a single fiber optical cable is terminated with the connector. This is especially true with molded plastic plugs, in which the passageway exhibits deviations both in roundness and straightness due to variations in molding conditions such as mechanical stress on the wire mandrel which forms the passageway at the time molten plastic flows into a mold cavity. In addition, curvature and deviation from roundness of the passageway can cause shadows which obscure the true position of the boundary, resulting in errors during visual or machine vision determination of the boundary and the centroid of the passageway. A further disadvantage of prior art techniques is the difficulty in determining the angular axis of the passageway by viewing axially the light beam exiting the passageway.

Although the methods and apparatus disclosed and claimed in the above-identified applications have resulted in improved yields, there is a desire to achieve still further improvements in the area of field mountable connectors. What still is needed is a simple solution to the problem of providing production plugs at a relatively high yield for biconic connectors which may be used for on-site, i.e. field, termination of multi or single mode lightguide fibers. Each production plug must be such that a centroid of the overall transverse cross section of an optical fiber adjacent to an end face of the plug is coincident with the axis of revolution of the truncated, conically shaped surface of the plug, and such that the centroidal axis of the end portion of the fiber in the plug is substantially coaxial with the axis of revolution of the end portion of the plug. Desirably, the solution does not require additional elements or time in connection procedures, but instead involves the reconfiguration of molded plugs.

SUMMARY OF THE INVENTION

The foregoing problems have been solved by the methods and apparatus of this invention. A method is provided to reconfigure an end portion of a plug, which includes a passageway within which is adapted to be disposed an end portion of an optical fiber, to cause an end face of the fiber as well as an end portion of the fiber to occupy a predetermined position with respect to an alignment surface of the end portion of the plug when the fiber is disposed in the plug.

The plug is held on a support on a turntable, having an axis of rotation, in such a manner that the end portion of the plug is exposed. Typically, a nominal size gauging member such as a length of optical fiber or other generally rigid pin is fitted temporarily into the passageway to extend beyond the end portion of the plug. The fiber serves as a solid extension of the passageway, enabling a more accurate determination of both the position and angle of the end portion of the passageway, and the manner in which the passageway interacts with and supports an optical fiber. In this application, centroid of the optical fiber or of the passageway is defined as the center of mass of a thin, uniform plate having the same transverse cross-section as the optical fiber or passageway. The longitudinal axis is a line determined by two spaced centroids along a length of a straight portion of the optical fiber or passageway. The support on which the plug is mounted is capable of angular movement about two orthogonal axes orthogonal to a vertical axis.

In carrying out a preferred method of this invention, a laser induced beam of light is directed toward the optical fiber transversely to the longitudinal axis of the optical fiber as the support is turned rotatably. Scattered light from the optical fiber is caused to impinge on a target area having a horizontally disposed target line. The target line represents the location of scattered light for a gauging member disposed in the passageway and having an end portion adjacent to the end face of the plug parallel to the axis of rotation of the support. The rotation of the turntable is discontinued and the location of a line of scattered light on the target area is observed on the target area. Facilities are operated to move pivotally the support through an angle in a $\phi$ plane to move the line of scattered light toward the target line. This procedure is repeated at a second position, spaced 90° circumferentially from the first, and a second line of scattered light is observed. Again the support is moved pivotally, this time in a $\Theta$ plane, to move the scattered light in the form of a line into congruence with the target line. As a result, the centroidal axis of the portion of the optical fiber adjacent to the end face of the plug is caused to become parallel with the axis of rotation.

Afterwards, a correction is made for the eccentricity of the centroidal axis of the optical fiber adjacent to the end face of the plug from the axis of rotation of the turntable. First, the location of the axis of rotation is determined. This is accomplished by viewing the location of the optical fiber under illumination by a horizontal collimated beam of light induced by an incoherent source and repeating this step at a position 180° removed therefrom. The distance between these two is divided by two which provides the distance from a reference point to the axis of rotation.

The centroid of the optical fiber at a first position already has been located during the determination of the location of the axis of rotation. An additional picture of the fiber is viewed after the turntable has been moved rotatably through an angle of 90°. From the horizontal distance from a reference axis to the location of each position on the circular trace of the geometrical center of the optical fiber, a determination is made of the eccentricity, the distance from the axis of rotation to the centroid of the optical fiber gauging member adjacent to the end face of the plug.

As a result of the offset determinations at each of the two locations, the apparatus is adjusted to move the plug support in X and Y coordinate directions to cause the center of the optical fiber adjacent to the end face of the plug to coincide substantially with the axis of rotation. Afterwards, the end portion of the plug is reconfigured to cause the axis of revolution of the alignment surface of the end portion of the plug to coincide with the axis of rotation of the turntable. As a result, the centroidal axis of the optical fiber gauging member in the end portion of the plug is in a predetermined location with respect to an alignment surface of the reconfigured end portion.

It is to be understood that the term reconfiguring is intended to cover various techniques for causing the plug to be restructured to cause it to have a conical surface having an axis of revolution which is coincident with the centroidal axis of the end portion of the optical fiber. Such techniques include grinding a molded plastic plug or machining a metal plug.

BRIEF DESCRIPTION OF THE DRAWING

Other objects and features of the present invention will be more readily understood from the following detailed description of specific embodiments thereof when read in conjunction with the accompanying drawings, in which:

FIG. 3 is an elevational view of a biconic connector arrangement for optical fiber cables which includes an alignment sleeve and two plugs each of which terminates an optical fiber;

FIG. 4 is a detail view of a portion of an optical fiber terminated with a biconic connector plug;

FIG. 5 is a detailed elevational view of a connector arrangement which includes two cylindrical plugs and an alignment sleeve;

FIG. 6 is a detail view of end portions of two plugs held within an alignment sleeve;

FIG. 16 is a perspective view which shows a portion of the apparatus of FIG. 1 which is used to align an axis of an end portion of a gauging length of optical fiber in a plug passageway with the axis of rotation of a turntable;

FIG. 18 is a perspective view of a portion of the apparatus of FIG. 1 which is used to correct for eccentricity;

DETAILED DESCRIPTION

Figure 1:
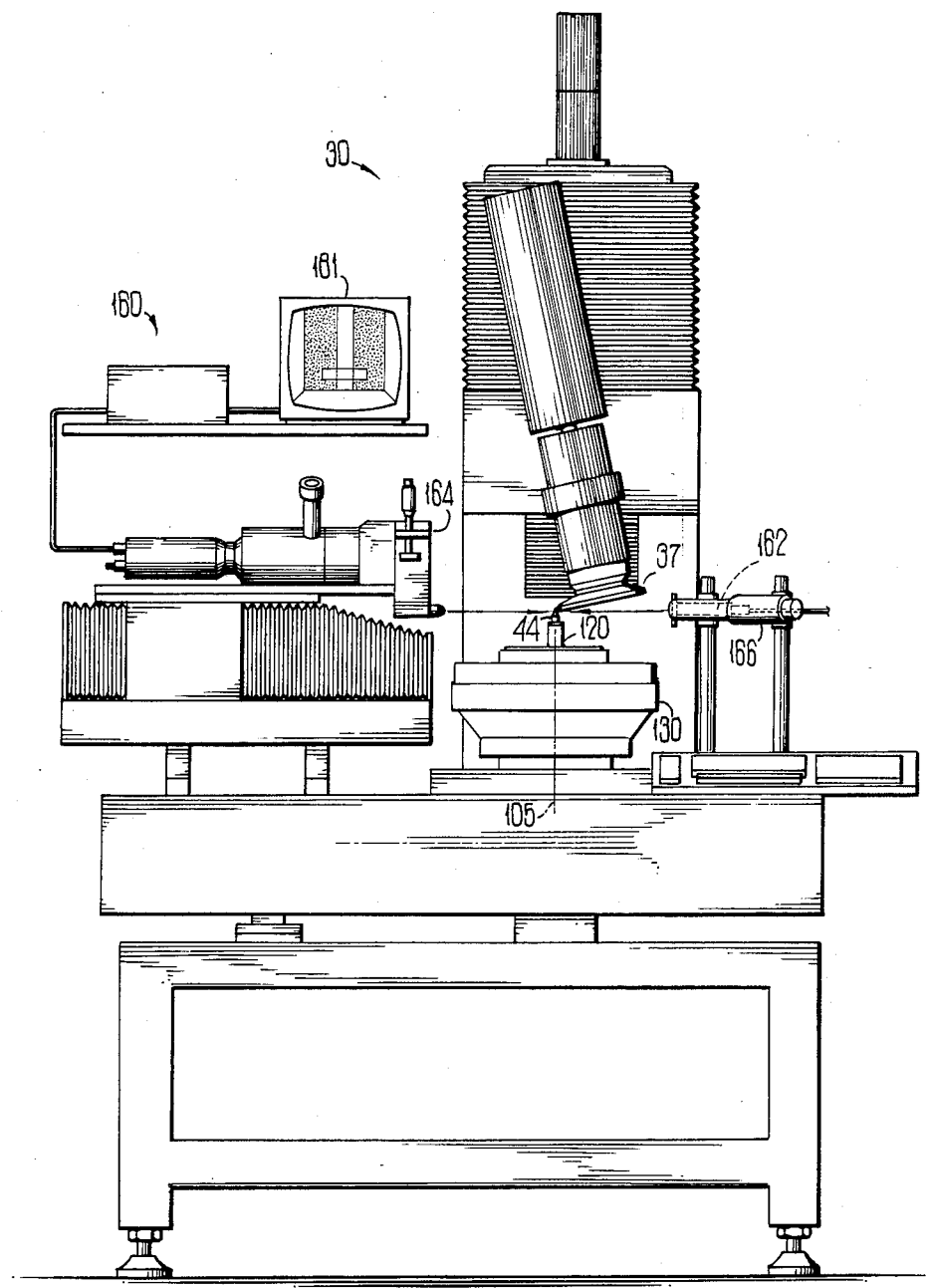
FIG. 1 shows an elevational view of an apparatus which is used to reconfigure a truncated, conically shaped optical fiber terminating plug in accordance with the methods of this invention.
Figure 2:
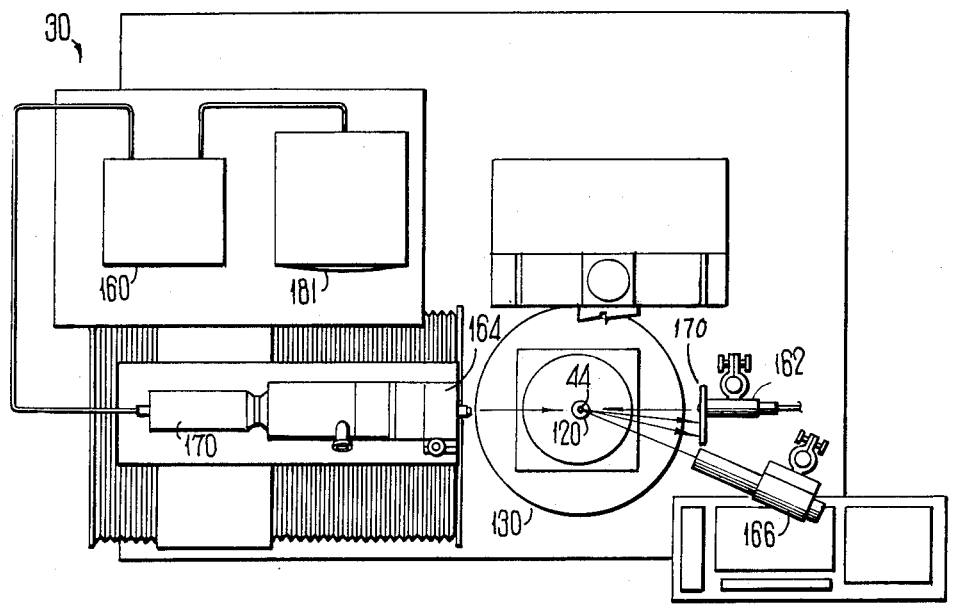
FIG. 2 is a plan view of a portion of the apparatus of FIG. 1 which is used to reshape the conical configuration of a plug in response to measurements of angular and lateral offset.

Referring now to FIGS. 1 and 2, there is shown an apparatus 30 which includes a rotatably and reciprocally mounted grinding tool 37 that is used to reconfigure a portion of a biconic connector which is designated generally by the numeral 40 and which is shown in FIGS. 3 and 4. The biconic connection of FIG. 3 includes a housing 42 for receiving two plugs 44-44, each of which terminates a lightguide or optical fiber 45 having a core 43. Both the plug and portions of the housing are made of a crushed silica, transfer molding grade epoxy composition, for example. As can be seen in FIG. 4, each plug 44 includes a cylindrical portion 46 which includes a bore 48, and an end portion 50 having a truncated conical shape. The end portion 50 which also is referred to as the primary pedestal includes a passageway 52 that communicates with the bore 48. It should be understood that other arrangements also are possible. FIG. 5 shows another arrangement in which two plugs 51-51 are cylindrical.

A coated single optical fiber 45 which has been jacketed with a plastic material such a polyvinyl chloride may be terminated with a plug 44 at each of its ends. The terminated, jacketed optical fiber is referred to as a single fiber or jumper cable 55. The jacketing material and the coating may be removed from an end portion 54 of the single fiber cable. The cable is inserted into the bore 48 until the bared end portion 54 is received in the passageway 52 with an end portion of the fiber 45 extending into a secondary pedestal 56 having an end face 57. In the alternative, a plug is molded about an end portion of an optical fiber. After being polished, an end face of the fiber 45 is coincident with the end face 57 of the secondary pedestal 56. The cable at its exit from the bore 48 is provided with a strain relief members 58 (see FIG. 4).

Each plug 44 is provided with retaining rings 60 and 62 (see FIG. 3). The retaining ring 60 abuts a collar 65 which is fixedly located about the plug 44. A compression spring 64 is disposed about the cylindrical portion 46 of the plug between the collar 65 and a collar 67. The plug 44 is positioned in an end portion of a threaded holder 66 with the collar 67 in engagement with an annular lip 68 interior to the holder. The retaining ring 62 is disposed about the cylindrical portion 46 of the plug 44 on the other side of the lip 68 to hold the plug within the holder. A threaded portion 74 extends from the holder 66 and the single fiber cable 55 extends in the other direction from within the holder 66.

A center portion 76 of the housing 42 is adapted to receive the two threaded plug holders and two plugs 44-44. The center portion 76 includes two opposed internally threaded cavities 78-78 and a flange 80 adapted to be mounted to a supporting surface. The flange 80 is aligned with an internally disposed annular collar 82 which extends toward a longitudinal axis 83 of the plug. An axis 84 (see FIG. 3) is the axis of revolution of the truncated conically shaped end portion 50 and often is referred to as the conical axis. The center portion 76 of the housing also is adapted to receive an alignment sleeve 86 which comprises two opposed truncated, conically shaped cavities 88 and 90 which meet at a common plane 92.

The alignment sleeve 86 is disposed within the portion 76 of the housing so that when the plugs 44–44 are mounted in the holders 66–66 and the threaded portions 74–74 turned into the cavities 78–78, the end portions 50–50 of the plugs are received in the cavities 88 and 90 with the secondary pedestals in the vicinity of the common plane 92. Also, as the threaded portions 74–74 are turned into the housing portion 76, the plug portions 46–46 are moved through the openings defined by the lips 68–68 to move the retaining rings 62–62 out of engagement with the lips (see left side of FIG. 3). The retaining ring 60 of the left plug as viewed in FIG. 3 is adjacent to a sleeve retaining ring 94. The ring 94 is threadably secured inside the housing portion 76 and although not necessarily in engagement with the sleeve, it prevents the sleeve from being removed inadvertently from the housing. The spring 64 causes the plug end portion 50 to be seated firmly in engagement with a wall 96 of the alignment sleeve. Further, the right plug end 50 as viewed in FIG. 3 is moved into the cavity 88 of the alignment sleeve 86 and contacts a wall 98. The sleeve 86 may float within an opening 99 in the collar 82 to facilitate alignment of the two plugs 44–44.

Ideally, to achieve minimum loss, the plugs 44–44 disposed within the sleeve 86 should have the axes of revolution of the conical end portions 50–50 aligned and end faces 57–57 of the fibers within the secondary pedestals 56–56 contacting each other (see FIG. 5) with centroidal axes of end portions of the fiber cores being substantially coincident with the axes of revolution. The outer surface of the conical end portion 50 of each plug 44 and the surfaces of the walls 96 and 98 (see FIG. 3) of the sleeve cavities are associated alignment surfaces which are intended to cause the desired positioning of the pedestals 56–56 when the conical end portions of the plugs are received in the sleeve 86.

The problem is that a centroidal axis 101 (see FIG. 7) of the passageway in the plug as molded is not necessarily coincident with the conical axis 84 of the end portion of the plug. Generally, for low losses, the centroidal axis 101 of an end portion of a passageway in the plug 44 must be in a predetermined location with respect to a lateral alignment surface of the plug. For the plug 44, the lateral alignment surface is the surface of revolution of the conically shaped end portion 50.

Figure 7:
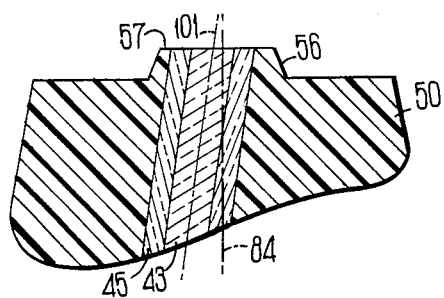
FIG. 7 is a detail view of a plug end portion which terminates an optical fiber to show a lateral offset and exit angle condition which may exist, the fiber core in this view being exaggerated for purposes of clarity.
Figure 9:
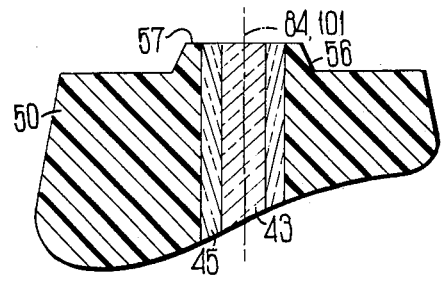
FIG. 9 is a detailed view of a plug to show a desired configuration in which the centroidal axis of an optical fiber coincides with the axis of revolution of the end portion of a plug.
Figure 8:
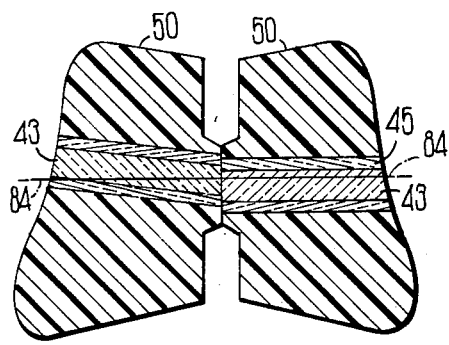
FIG. 8 is an enlarged view of two plug end portions in an alignment sleeve to show misalignment of fiber cores.

Referring now to FIG. 7, there are shown lateral and angular offsets which may exist in an end face when using as-molded plugs. As can be seen in FIG. 7, an end face of the optical fiber terminates in an end face 57 of the pedestal 56 and is perpendicular to the conical axis 84. However, the centroidal axis 101 of the end portion of the passageway typically is not coincident with the conical axis 84. Generally, it has a lateral offset therefrom where the fiber intersects the end face of the pedestal 56, and further, it may have an angular offset or exit angle with respect to that axis such that a beam of light emerging from an end portion of an optical fiber is at an angle to the conical axis. As a result, when two plugs 44–44 are received in an alignment sleeve, the centroidal axes of the cores 43–43 being in a predetermined location with respect to those alignment surfaces are misaligned (see FIG. 8). Desirably the final product includes a truncated, conically shaped end portion in which the centroidal axis of an end portion of the passageway and the axis of revolution of the end portion 50 of the plug 44 are coincident (see FIG. 9). The lateral and angular offsets may be corrected by reconfiguring the end portion of the plug 44.

For field-mountable plugs, there are no optical fibers in the passageways when they are shipped. In the past, these plugs have been corrected by viewing axially a beam of light emitted from the plug passageway, by adjusting the position of the plug on its support as a result of angular and lateral offsets determined from that beam as the plug is rotated and reconfiguring the plug. For reasons set forth hereinbefore under Background of The Invention, this procedure does not provide as high a yield as is desired. Accordingly, this invention is directed to providing field mountable plugs that have improved yields.

Figure 10:
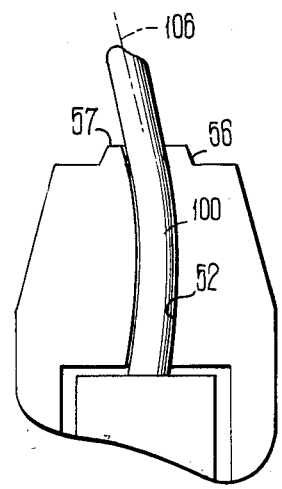
FIG. 10 is an enlarged view of a plug end to show a gauging length of optical fiber, extending from a passageway in a plug.

This invention provides for the use of an elongated gauging member 100 which is inserted into the passageway at the outset (see FIG. 10). The cross section of the gauging member tranverse to the longitudinal axis is congruent to that of the optical fiber to be terminated by the plug and is slightly smaller than the transverse cross section of the passageway into which it is inserted. Because of the curvature of the passageway, any generally rigid gauging member such as a length of optical fiber inserted into it will assume the same position therein. Although the optical fiber may not be centered in the passageway, what is important is that the centroidal axis of the optical fiber, as determined by its geometrical center, become aligned with the axis of revolution of the alignment surface of the plug. In practicing the methods of this invention for field-mountable plugs, it is assumed that the centroidal axis of the optical fiber is coincident with that of its core. Exit angle correction is made to insure that the optical fiber axis 101 (see FIG. 9) will be parallel to the conical axis 84 or axis of rotation after the conical end portion 50 of the plug is reshaped.

Figure 11:
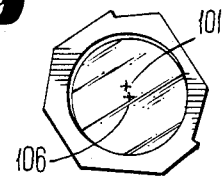
FIG. 11 is a plan view of an end portion of a plug showing relative displacement between a plug passageway and a fiber inserted in the passageway resulting from slight curvature of the passageway.

In summary, to process and reconfigure a plug 44 requires mounting and holding the plug, which generally leaves the conical axis 84 displaced from an axis of rotation 105 (see FIG. 1) of the support. Further, because of manufacturing imperfections, the axis 101 of end portion of the passageway in the plug 44 is displaced from the axis 84. The methods and apparatus of this invention are effective to configure a plug 44 after the centroidal axis 106 (see FIG. 11) of an end portion of the fiber adjacent to the end face 57 of a plug 44, which is identical in position to an optical fiber to be terminated by the plug, has been caused to be substantially coincident with the rotational axis 105. As a result of reconfiguring, the axis of revolution of the end portion of the plug is caused to coincide with the axis of rotation of the turntable. It follows that this causes the centroidal axis 106 of the end portion of the gauging member adjacent to the end face 57 to coincide substantially with the axis of revolution of the end portion of the plug. Of course, as is shown in FIG. 11, the axis 106 of the gauging length of optical fiber may be offset slightly from the axis 101 at the passageway. However, because the fiber which the plug is destined to terminate will occupy the same position as the gauging length of fiber, it is important to reconfigure the plug so that the axis of revolution 84 of the plug is coincident with the axis 106 of the fiber.

The adjustments in the position of the plug on the turntable are carried out with the short length of nominal diameter optical fiber 100 in the plug passageway. The short length of optical fiber is referred to as a gauging length of fiber and is effectively an extension of the passageway. It should be pointed out that the passageway in the plug typically has a relatively slight curvature (see FIG. 10). This is substantiated by the fact that the exit angle at one end of the plug differs from that at an opposite end of the plug. This is advantageous in that whenever an optical fiber such as that to be terminated in the field is positioned in the passageway, it will be disposed in substantially the same position within that passageway as the gauging optical fiber. As a result, the repeatability of the adjustment position is insured. Then, in the field, when an optical fiber cable is terminated by the plug, the fiber of that cable will occupy the same position in the plug passageway as did the gauging length of fiber.

In order to reconfigure the end portion 50 of the plug 44 to cause the fiber axis 106 to be coincident with the conical axis 84, it first becomes necessary to correct for the exit angle from the rotational axis 105 to the axis of the end portion of the gauging length of optical fiber adjacent to the end portion 50 of the biconic plug. The first step in detecting and measuring the exit angle is to establish a frame of reference in three dimensions to which angles and positions can be referred for each new plug to be measured.

Figure 13:
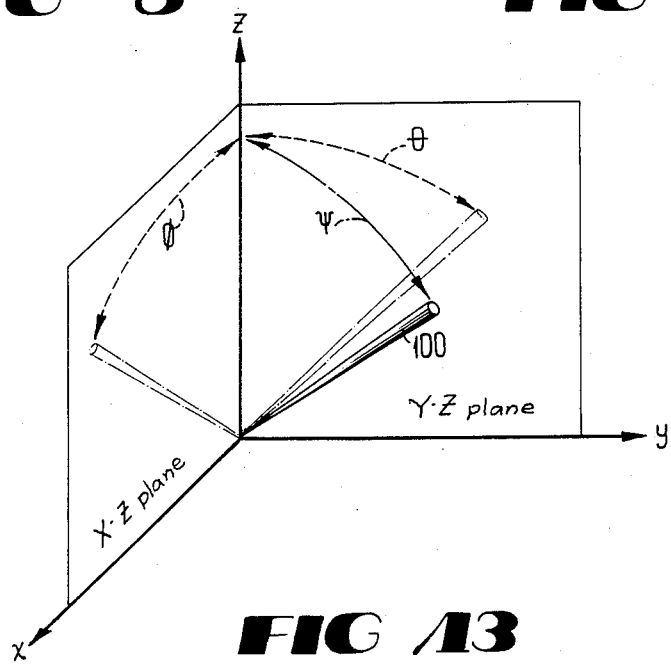
FIG. 13 is a perspective view which shows the components of an angle referred to as the exit angle.
Figure 12:
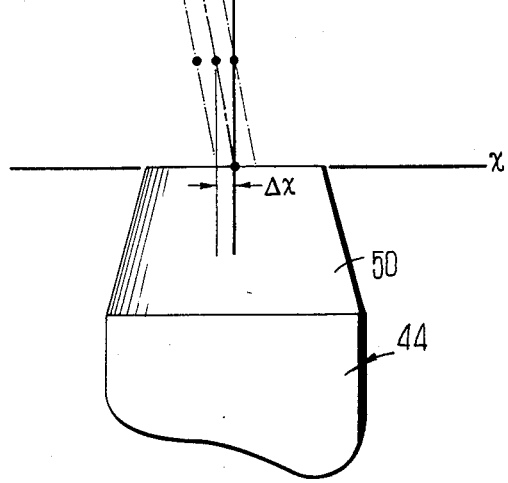
FIG. 12 is a view of a coordinate system convention which is used is practicing the methods of this invention.

For this description, the axis which is substantially parallel to the axis of rotation, is called the Z axis. The X axis is normal to the Z axis, as is the Y axis (see FIG. 12). The angle between the centroidal axis of the optical fiber adjacent to the end face and the axis of rotation is designated $\psi$ (see FIG. 13). In a preferred embodiment, the axis of rotation is oriented vertically.

Considering coordinate X and Y planes which intersect in the vertical Z axis (see FIG. 13), it becomes possible to determine the coordinate components of the angle $\psi$. If it is assumed that the extension of the passageway, i.e., the gauging length 100 of optical fiber, can be represented by a space vector, then the projection of the vector into the XZ plane Y=O, results in a line which is at an angle $\phi$ (see FIG. 13) to the vertical or Z axis. Similarly, the projection of the vector into the other vertical coordinate plane, the YZ plane X=O, results in a line which is at an angle $\theta$ to the vertical axis.

Unlike prior art techniques in which images were taken of the end face of a truncated conically shaped end portion of a plug which was supported on a turntable, this invention is directed to a determination of and correction for exit angle and eccentricity by illuminating and viewing an extension of the plug passageway in a direction transversely of the plug passageway. Accordingly, the plug must be held at its lower end to expose the conically shaped end portion to the tool 37. Accordingly, an operator causes a plug 44 having a truncated, conically shaped end portion to become held in a chuck 111 (see FIG. 14) so that its truncated, conically shaped end portion is exposed.

The chuck 111 is supported on a pedestal 120 (see FIG. 14) which permits it to be exposed to the grinding tool 37. The pedestal 120 is supported through a mounting ring 123 by a spherical bearing 124 which is mounted on a turntable 130 (see FIGS. 14 and 15) having the fixed axis of rotation 105. The tip of the plug 44 is elevated so that it is positioned at the center of curvature of the spherical bearing.

Figures 14, 15:
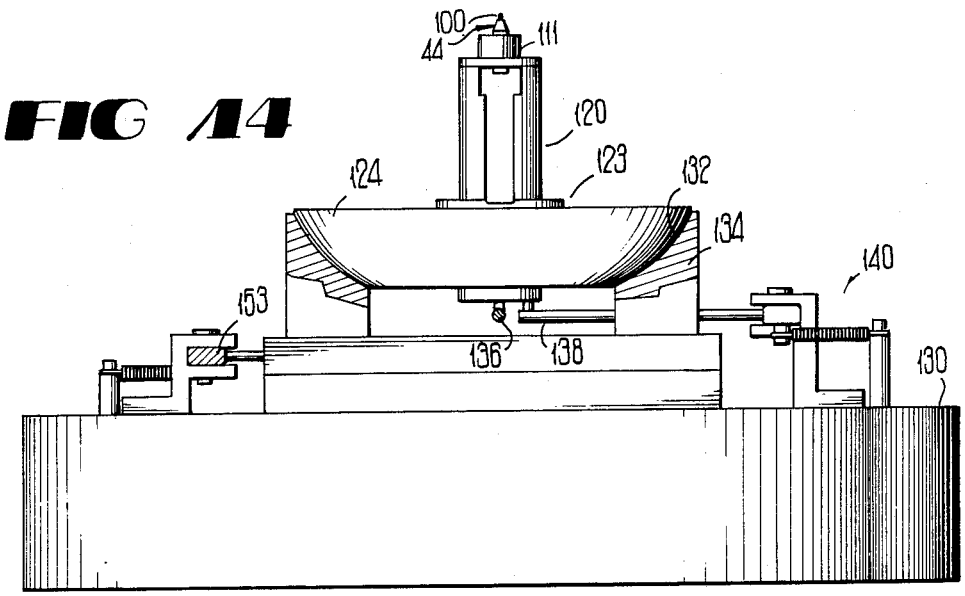
FIG. 14 is a side elevational view of a support for a biconic connector plug.
FIG. 15 is a plan view of the support of FIG. 14.

The plug 44 is held at its base in a manner which allows the plug to be tilted with a minimum amount of translation in the X and Y directions. As can be seen in FIGS. 14 and 15, the bearing 124 is engaged by a mating surface 132 of a support 134, which is mounted on the turntable 130. The bearing 124 is adapted to be tilted in angular coordinate directions $\theta$ and $\phi$ by a positioner 140 including arms 136 and 138 each of which extends through the support 134 from an arm 139 which is mounted pivotally in a support 141. The $\theta$ axis controls angular motion parallel to the plane X=O (see FIG. 13) whereas the $\phi$ axis controls rotation which is parallel to the plane Y=O. An end of each arm 139 is engaged by a plunger 142 of a precision motor 143. A spring 145 urges each arm 136 and 138 in a direction outwardly of the bearing.

Further as can be seen in FIGS. 14 and 15, the bearing support 134 is adapted to be moved in X and Y coordinate directions by a translator portion of the positioner 140. Each portion of the translator includes a force applicator 151 mounted at one end of an arm 153 that is engaged by a plunger 155 of a precision motor 157. The arm 153 is supported for pivotal movement in a bearing 158 and is biased outwardly by a spring 159.

It also should be understood that whereas in the preferred embodiment of this invention, the axis of rotation 105 of the turntable 130 is vertical, the invention is not so limited. The axis of rotation could just as well be adapted to be horizontal with the end face of the fiber and pedestal being vertical and normal thereto.

Each plug is mounted using its cylindrical portion as a reference surface. Although efforts are made to assure that the axis 83 of the cylindrical portion and conical axis 84 are aligned, small disturbances such as molding flash or fixture misalignment can contribute to angular shift in the conical axis with respect to the axis of rotation 105 of the turntable.

In order to determine exit angle and eccentricity of the end portion of the plug passageway, a gauging length 100 of optical fiber is inserted into the end portion of the plug passageway (see FIG. 10). Prior to beginning the grinding operation to reconfigure the end portion of the plug, the centroid of the optical fiber gauging member 100 adjacent to the end surface of the plug must lie on the axis of rotation of the turntable and the axis of the gauging length of fiber must be parallel to the axis of rotation of the turntable.

Information is obtained as to misalignment from lateral offset by directing light from a source 162 (see FIGS. 1 and 2) of incoherent light toward the lateral portion of the gauging length of optical fiber which extends from the plug pedestal, and processing light detected by a microscope 164 by a machine vision system 160. Examples of commercially available machine vision systems are one manufactured by International Robomation Intelligence, Inc. and designated P256, and one manufactured by View Engineering Co. and designated model 719. A machine vision system is a system which acquires images emanating from an article and provides an output based on an analysis of the acquired images. Such an analysis can be used to determine properties of the article such as, for example, orientation and changes in those properties as a result of an action taken in response to the output. Use of this information guarantees that the apparatus 30 will shape a truncated cone around the appropriate axis, which is coincident with the longitudinal axis of the fiber, so that a mating part receives transmitted light at a well-defined position and in a direction normal to its surface.

Before the plug has been clamped in the apparatus 30, the gauging length 100 of optical fiber is inserted into the plug passageway and the turntable 130 is caused to rotate (see FIGS. 1 and 2). The optical fiber gauging member axis 106 and the rotational axis 105 are determined in accordance with the methods of this invention.

In order to be able to reconfigure a molded plug to cause the axis of an optical fiber in one end portion of the plug to coincide with the axis of rotation of the plug, it becomes necessary to make a two step adjustment prior to the reconfiguring operation. First, the support on which is held the plug is moved pivotally to cause the axis of the optical fiber in the passageway of the plug to be parallel to the axis of rotation. Secondly, the support for the plug is moved in X and Y coordinate directions until the axis of rotation extends through the centroid of the optical fiber adjacent to the end face 57 of the plug.

Performance of the first portion of this plug repositioning process is carried out by causing a beam of light from a source 166 of coherent light such as a laser, for example, to be directed horizontally toward the vertically oriented optical fiber which is disposed in the plug passageway. The angular displacement of the gauging length of optical fiber and hence of the passageway is determined by causing the plug to be turned rotatably about the axis 105 and measuring the magnitude of the deviation of the scattered pattern from a reference line. This technique is based on the principle of light scattering wherein a diffraction pattern occurs for 360° around an object when the object intercepts coherent light such as that obtained from a laser.

Advantageously, the laser beam has a diameter, typically 2000 microns, which is somewhat larger than the diameter of the uncoated optical fiber, typically 125 microns. When the light beam strikes the gauging length of optical fiber, a disc of light is caused to fan out from the optical fiber (see FIG. 16). This disc appears as a line on a target area 170 which includes a horizontal target line 172. The target line 172 is established for a plug in which the optical fiber axis at the end portion of the plug coincides with the axis of rotation.

Viewing now FIG. 16, it can be seen that at a first position of the plug, the impingement of the laser beam on the optical fiber causes scattered light from the optical fiber to establish a line 174 on the target area which may be displaced vertically from the target line. An operator controls the apparatus to move pivotally the support to cause the line 174 of scattered light to be moved into coincidence with the target line 172. This is accomplished by tilting the plug support in one plane which is referred to as the $\phi$ plane.

Afterwards, the plug is caused to be rotated through an angle of 90° to the first position and the steps repeated. At that second position, the laser beam is again directed toward the optical fiber in the passageway and scattered light therefrom is displayed on the target areas as a horizontal line 176, in all likelihood displaced from the target line 172. The operator causes the support to be moved pivotally in a plane $\theta$ which is normal to the $\phi$ plane until the displayed line coincides with the target line. As a result of this two step procedure, the axis of the optical fiber at the one end of the plug should be parallel to the axis of rotation (see FIG. 9). The process may be repeated through several iterations.

Figure 17:
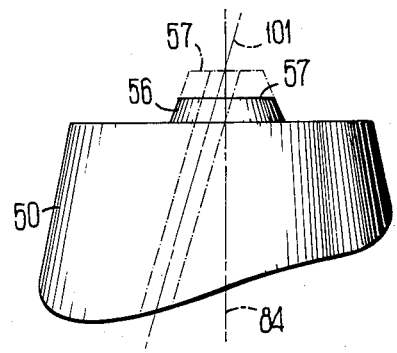
FIG. 17 is an enlarged view of a plug end after it has been used to terminate an optical fiber and after it has been polished.

It should be noted that the correction for exit angle is made prior to correcting for eccentricity. If the corrections were not done in this sequence, the correction for eccentricity which occurs in a plane somewhat above the end face of the plug would not coincide with the axis of rotation at the end face of the plug (see FIG. 17). Although the scattered light from the laser engaging the optical fiber could be exhibited on the target areas as the plug is being turned rotatably, it is sufficient to have the exhibition occur at two stationary positions of the plug. These positions are spaced apart circumferentially through an angle of 90°.

Figure 19:
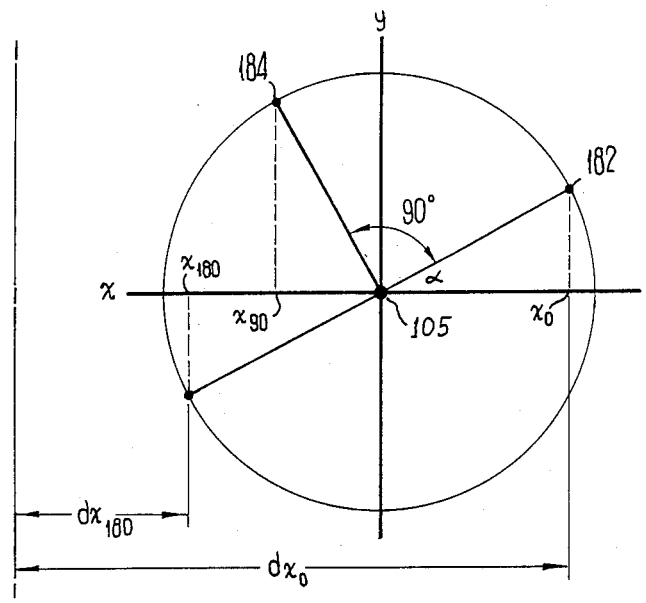
FIG. 19 is a plan view which shows positions of the center of the gauging length of optical fiber in the plug passageway adjacent to the end face of the plug at several positions upon rotation of the turntable.

Following the adjustment for the exit angle, the plug is moved to cause the centroid of the optical fiber adjacent to an end face of the plug to coincide with the axis of rotation adjacent to the end face. As a first step in such planar reorientation, the location of the axis of rotation 105 must be determined. This is accomplished by directing a collimated beam of light produced by the incoherent source 162 toward the optical fiber with the microscope 164 aligned therewith on the opposite side of the optical fiber (see FIGS. 1 and 18). The lateral image of the gauging length of optical fiber under illumination by the source of incoherent light is caused to be displayed on a monitor 181. A distance $d_{xo}$ from a reference axis horizontally to the projection of that image on the X axis is determined (see FIG. 19). Then the turntable is caused to be rotated to displace the optical fiber 180° from the first position. With the beam of light being directed at the optical fiber, a horizontal distance $d_{x180}$ from the reference axis to the X projection of the location of the optical fiber is determined. The sum of the distances $d_{xo}$ and $d_{x180}$ from the reference axis to these two points is determined and divided by two. The result is the distance from the reference axis to the axis of rotation 105 of the turntable.

The location of the plug positions used in the determination of the location of the axis of rotation must be 180° apart. However, for the eccentricity determination, the two positions whereat the centroid of the optical fiber adjacent to the plug end face is determined need be spaced apart through a known angle. In a preferred embodiment shown in FIG. 18, this angle is 90°. It must be known so that at a first position 182, the location of the fiber centroid allows a correction for eccentricity in one coordinate direction, the X projection of the eccentricity at the first position, and in a second position 184 allows correction for eccentricity in a second coordinate direction, the Y projection of the eccentricity of the second position orthogonal to the first. Because the two positions are spaced 90° apart, the X projection of the second position is equal to the Y projection of the first position (see FIG. 19). As a result of these determinations, the plug support is moved in X and Y coordinate directions, generally in several iterations, to cause the centroid of the gauging length 100 of optical fiber adjacent to the end face of the plug to coincide with the axis of rotation of the turntable.

It should be mentioned that the location of the centroid of the optical fiber is determined from a relatively small window 190 (see FIG. 20) in the band of light which appears on the monitor 181 as shown in FIG. 1. The machine vision system inspects the window which is the area of interest and calculates the centroid of the portion above the visual threshold. This is preferable to a determination along a line inasmuch as the calculation for an area will more nearly produce the correct centroid. The centroid of the portion of the band of light above the visual threshold and inside the window determines the location of the gauging length of fiber.

Figures 20, 21:
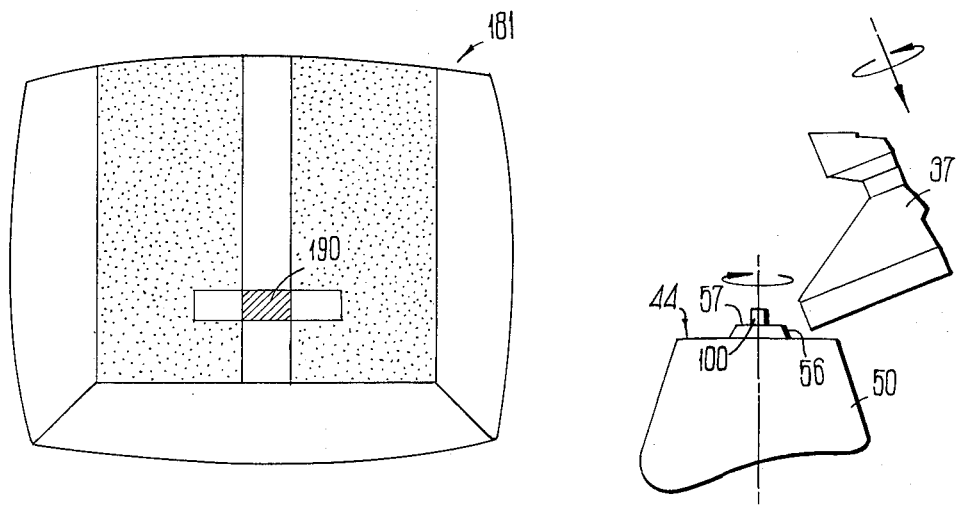
FIG. 20 is an elevational schematic view to show a window of a light image of an elevational view of the gauging length of optical fiber in the plug passageway which is used to determine the centroid of the geometrical cross section of the optical fiber.
FIG. 21 is an elevational view which shows a reconfiguring tool adjacent to a plug.

At this time, all repositioning having been done, the grinder tool 37 is moved to cause the disc-like head to engage the conical end portion 50 of the plug 44 (see FIG. 21). The grinder head reconfigures the conical end portion 50 of the plug to provide a truncated conically shaped end portion the axis of which is coincident with the axis of rotation of the turntable. Because the axis of the gauging length of optical fiber adjacent to the plug end face is parallel with the axis of rotation 105, and because the centroid of the gauging length of optical fiber adjacent to the end face of the plug coincides with the axis of rotation, the fiber axis is substantially coincident with the conical axis of the reconfigured plug. This results in a relatively low or zero exit angle and contributes to increased performance and higher yields over as-molded plugs.

It is to be understood that the above-described arrangements are simply illustrative of the invention. Other arrangements may be devised by those skilled in the art which will embody the principles of the invention and fall within the spirit and scope thereof.

What is claimed is:

1. A method of configuring an end portion of a plug which is adapted to terminate an end portion of an optical fiber, said method including the steps of:
    inserting an elongated gauging member having a longitudinal axis into a passageway which extends through an end portion of the plug such that a portion of the gauging member extends beyond an end face of the end portion of the plug;
    holding the plug so that it may be turned about an axis of rotation;
    turning rotatably the plug about the axis of rotation;
    determining the location of the axis of rotation about which the plug is turned;
    directing a beam of light into engagement with the portion of the gauging member that extends beyond the end face of the plug in a direction transverse to the longitudinal axis of the gauging member;
    determining the location of the centroid of the gauging member adjacent to the end face of the plug at a first position of the plug and then at a second position after the plug has been turned rotatably through a predetermined angle;
    determining the eccentricity of the gauging member from the axis of rotation;
    moving the plug to cause the centroid of the gauging member adjacent to the end face of the plug to coincide with the axis of rotation; and
    configuring the plug to cause the centroid of the gauging member adjacent to the end face of the plug to coincide with the axis of rotation and the axis of revolution of the configured outer surface of the end portion of the plug.

2. The method of claim 1, which prior to the determination of the location of the axis of rotation, includes the step of causing a portion of the axis of the gauging member in the plug to be parallel to with the axis of rotation.

3. The method of claim 1, wherein an optical fiber cable is adapted to be terminated by the plug and an optical fiber gauging member having a transverse cross section which is congruent to that of the optical fiber to be terminated by the plug is disposed in the passageway.

4. The method of claim 3, wherein the axis of rotation is determined by directing a collimated beam of incoherent light transverse to the fiber axis at each of two locations spaced 180° apart and by measuring the distance from a reference point along a coordinate axis to each of the two locations and by then dividing the sum of these measurements by two.

5. The method of claim 4, wherein subsequent to a determination of the location of the axis of rotation, distances along reference coordinate axes are determined at each of two locations which are spaced 90° apart.

6. The method of claim 5, wherein after the location of the axis of rotation has been determined, the centroid of the optical fiber adjacent to the end face of the plug is determined at each of the two locations.

7. The method of claim 6, wherein subsequent to the location of the centroids of each of two locations, the eccentricity of the optical fiber centroid from the axis of rotation is determined and the plug is moved to cause the eccentricity to be reduced substantially to zero.

8. The method of claim 1, wherein the end portion of the plug has a truncated conical alignment surface and the plug is configured to cause the axis of revolution of the alignment surface to coincide with the axis of the fiber for a length of the fiber adjacent to the end face of the plug.

9. An apparatus for configuring an end portion of a plug, which is adapted to terminate an end portion of an optical fiber, said apparatus including:
    support means having an axis of rotation for holding the plug, which includes a passageway within which is adapted to be disposed an end portion of an elongated gauging member, such that the end portion of the plug is exposed;
    means for causing rotation of said support means;
    source means for projecting a beam of light into engagement with a portion of the gauging member that extends beyond an end face of the plug in a direction transverse of the longitudinal axis of the gauging member;
    means responsive to the rotation of the plug and to the projection of the beam of light for determining the centroid of the cross-sectional area of the gauging member adjacent to the end face of the plug at a first position and then at a second position after the plug has been turned rotatably through a predetermined angle;
    moving means for causing relative motion between said support means and the axis of rotation to cause the centroid of the cross-sectional area of the gauging member adjacent to the end face of the plug to coincide with the axis of rotation; and
    means responsive to the relative motion between the axis of rotation and the plug for configuring the end portion of the plug to cause the centroidal axis of the gauging member adjacent to the end face of the plug to be in a predetermined location with respect to an alignment surface of the configured end portion.

10. The apparatus of claim 9, which also includes angular adjustment means rendered effective prior to the determination of the axis of rotation for causing the axis of the gauging member in the plug to be parallel to the axis of rotation.

11. The apparatus of claim 10, which also includes means for directing a collimated beam of coherent light toward the gauging member in a direction transverse of the longitudinal axis of the gauging member and target means for receiving scattered light from the gauging member as the plug is turned rotatably, the scattered light from the gauging member as the plug is turned rotatably, the scattered light being displayed on said target means whereupon said angular adjustment means is rendered effective to move pivotally said support means and cause the scattered light to be moved toward a target line on said target means.

12. The apparatus of claim 11, which also includes means for tilting the plug to cause the longitudinal axis of the gauging member adjacent to the end face of the plug to be parallel to the axis of rotation.

13. An apparatus for adjusting an end portion of a plug, which is adapted to terminate an end portion of an optical fiber, said apparatus including:
- support means having an axis of rotation for holding the plug, which includes a passageway within which is adapted to be disposed an end portion of an optical fiber, such that the end portion of the plug which includes a surface generated about an axis of revolution is exposed;
- a gauging length of optical fiber which has a longitudinal axis, which is disposed in said passageway to extend beyond an end face of the plug and which has a cross section transverse of the longitudinal axis that is congruent to that of the optical fiber to be terminated by the plug;
- means for causing rotation of said support means;
- light system means for projecting a beam of light into engagement with the portion of the gauging length of optical fiber that extends beyond an end face of the plug in a direction transverse of the longitudinal axis of the gauging length and for acquiring images of the illuminated gauging length at locations spaced about the axis of rotation to determine the orientation of a portion of the gauging length with respect to the axis of rotation;
- orienting means including means connected to said support means and light system means for determining the orientation of the axis of a portion of the gauging length with respect to the axis of rotation for causing relative angular motion between the axis of rotation and the plug to cause the axis of a portion of the gauging length adjacent to the end portion of the plug to be parallel to the axis of rotation;
- means for determining the location of the axis of rotation and for determining the centroid of the cross-sectional area of the gauging length adjacent to an end face of the plug;
- translating means for moving the plug to cause the centroid of the cross-sectional area of the gauging length adjacent to the end face of the plug to coincide with the axis of rotation; and
- tool means responsive to relative motion caused by said orienting means and to movement caused by said translating means for reconfiguring the end portion of the plug to cause the axis of a portion of the gauging length to be coincident with the axis of revolution of the reconfigured end portion.

14. The apparatus of claim 13 wherein said tool means includes means for causing an end portion of the plug to have a truncated, conical shape and said light system means includes a laser for providing a beam of coherent light.

15. The apparatus of claim 13, wherein said light system means is used to determine orthogonal components of an angle which the axis of the gauging length makes with the axis of rotation and which controls said orienting means.

16. The apparatus of claim 15, wherein said means for determining the centroid includes a source for providing a collimated beam of incoherent light.

17. The apparatus of claim 16, said apparatus comprising:
- means including means for acquiring an image of the illuminated gauging length for determining the location of the centroid of the gauging length at two locations in a plane which is normal to the axis of rotation, the locations of the centroid in the plane being determinative of the eccentricity of the optical fiber gauging length from the axis of rotation adjacent to the end face of the plug.

18. The apparatus of claim 17, wherein the reconfiguring is accomplished while said turntable is rotated.

19. The apparatus of claim 17, wherein said means for acquiring an image comprises a machine vision system.

20. The apparatus of claim 19, wherein the machine vision system includes provisions for digitizing and segmenting each acquired image.

21. The apparatus of claim 19, wherein said translating means and said orienting means are connected to a general purpose digital computer.

22. The apparatus of claim 21, wherein said translating means also includes a motor which is associated with each coordinate direction, the motors being controlled by said computer.

23. A plug which is adapted to terminate an end portion of an optical fiber, said plug being configured in accordance with the method of claim 1.

24. A plug which is adapted to terminate an end portion of an optical fiber, said plug being configured in accordance with the method of claim 2.

* * * * *